(12) United States Patent
Lentner et al.

(10) Patent No.: US 12,076,794 B2
(45) Date of Patent: Sep. 3, 2024

(54) MULTIPURPOSE CHUCK

(71) Applicant: Hammill Manufacturing Company, Co-op Tool Division, Maumee, OH (US)

(72) Inventors: Greg Lentner, Monclova, OH (US); Mike Pelleteri, Lambertville, MI (US)

(73) Assignee: Hammill Manufacturing Company, Co-op Tool Division, Maumee, OH (US)

( * ) Notice: Subject to any disclaimer, the term of this patent is extended or adjusted under 35 U.S.C. 154(b) by 299 days.

(21) Appl. No.: 17/655,450

(22) Filed: Mar. 18, 2022

(65) Prior Publication Data
US 2023/0294180 A1 Sep. 21, 2023

(51) Int. Cl.
*B23B 31/28* (2006.01)
*B23B 31/163* (2006.01)

(52) U.S. Cl.
CPC ........ *B23B 31/28* (2013.01); *B23B 31/16008* (2013.01); *B23B 2231/56* (2021.01); *B23B 2270/205* (2013.01); *Y10T 279/1941* (2015.01); *Y10T 279/22* (2015.01); *Y10T 279/23* (2015.01); *Y10T 279/29* (2015.01)

(58) Field of Classification Search
CPC .............. B23B 31/16008; B23B 31/28; B23B 2231/56; B23B 2270/205; Y10T 279/1941; Y10T 279/22
See application file for complete search history.

(56) References Cited

U.S. PATENT DOCUMENTS

| 6,681 | A |  | 8/1849 | Martin et al. |
| 2,725,236 | A | * | 11/1955 | Skillin .............. B23B 31/16004 |
|  |  |  |  | 279/116 |
| 2,784,977 | A |  | 3/1957 | Dinsmore |
| 2,842,371 | A | * | 7/1958 | Kersten ................ B23Q 16/002 |
|  |  |  |  | 279/123 |
| 4,828,276 | A |  | 5/1989 | Link et al. |
| 4,868,969 | A | * | 9/1989 | Cerny .................. B23Q 39/048 |
|  |  |  |  | 82/1.11 |
| 5,251,918 | A |  | 10/1993 | Morgan |
| 5,649,460 | A |  | 7/1997 | Berns et al. |
| 7,204,493 | B1 |  | 4/2007 | Gatton |
| 7,594,665 | B2 |  | 9/2009 | Crowley et al. |
| 8,596,172 | B2 |  | 12/2013 | Hebert |
| 8,746,704 | B2 |  | 6/2014 | Dejonghe et al. |
| 9,061,357 | B2 | * | 6/2015 | Ogawa .................... B23B 31/28 |
| 10,688,670 | B2 |  | 6/2020 | Zhang et al. |

(Continued)

FOREIGN PATENT DOCUMENTS

| CH | 121387 | | 9/1926 | |
| DE | 202009013226 | U1 * | 1/2010 | ............. B23Q 3/152 |
| DE | 202013101345 | U1 * | 8/2013 | ....... B23B 31/16204 |

(Continued)

*Primary Examiner* — Eric A. Gates
(74) *Attorney, Agent, or Firm* — McHale & Slavin, P.A.

(57) ABSTRACT

A multipurpose chuck having provisions for gripping the outer diameter of workpieces; alternatively, the inner diameter of workpieces; alternatively gripping parts by a two vise jaw, or in combination with a magnet attraction. The chuck having six radially movable jaws that can be used in combination, or by itself with vise grip jaws, which can be used in combination or by itself with a magnetic workpiece attachment in a single chuck.

9 Claims, 22 Drawing Sheets

(56) References Cited

U.S. PATENT DOCUMENTS

2009/0096177 A1\* 4/2009 Rohm .................... B23Q 3/152
279/121

FOREIGN PATENT DOCUMENTS

| EP | 2105226 | A1 \* | 9/2009 | ....... B23B 31/16245 |
| EP | 2298475 | A1 \* | 3/2011 | ........... B23B 31/101 |
| GB | 2267239 | | 12/1993 | |

\* cited by examiner

MULTIPURPOSE CHUCK

FIELD OF THE INVENTION

The invention is directed to the field of machining; and, in particular, to a multipurpose chuck.

BACKGROUND OF THE INVENTION

Chuck fixtures are used to secure workpieces at a precisely defined position in an X-Y-Z coordinate system. An adjustable chuck saves time in machine tool set up, wherein the chuck can be adjusted to grip workpieces of different sizes. A conventional chuck typically has three or more radially movable jaws to retain a specific workpiece. The movable jaws are attached to actuators which move the jaws radially inwardly and outwardly to engage the workpiece. However, machine tools are not limited to a single shaped workpiece wherein different shaped workpieces require different types of chucks for proper alignment. Vise grip chucks having two opposing jaws are attached to actuators which move the jaws together to clamp the workpiece. A conventional magnetic chuck comprises a shiftable plate in a frame structure movable in the direction of the arrangement of magnetic pole face portions of a work supporting faceplate. Pole pieces made of soft iron and permanent magnets are alternately arranged with an equal pitch in the direction of its shifting movement, with the magnetization directions of the magnets being directed either upwardly or downwardly to the same direction.

What is lacking in the industry is a multipurpose chuck having three or more radially movable jaws in combination with a vise grip and magnetic workpiece attachments in a single chuck, limiting the need for chuck changes.

SUMMARY OF INVENTION

Disclosed is an integrated chuck have operations defined as: 1) sliding chuck—grips parts by the inner diameter or outer diameter; 2) two-jaw vise—grips parts that lack a uniform cylindrical shape; and 3) magnetic chuck—holds parts by magnetic attraction. The integration of the various chuck mechanisms into a single chuck is not known in the prior art.

It is an objective of the invention to provide a chuck fixture which allows precise and reproducible clamping.

Another objective of the invention is to provide a multipurpose chuck having three or more radially movable jaws, two of which can operate as vise grip jaws which can be used in combination or by itself with a magnetic workpiece attachment in a single chuck.

Still another objective of the invention is to provide a multipurpose chuck for gripping workpieces of different sizes and shapes wherein a positive clamping of the workpiece is achieved using jaws that apply equal pressure against a workpiece to prevent distortion and eccentric location of the workpiece.

It is another objective of the invention to provide a chuck of a type which will hold hollow work or solid work, which will permit machining of the inner and outer work surfaces to high precision in the uniformity of the wall thickness of a peripheral wall.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
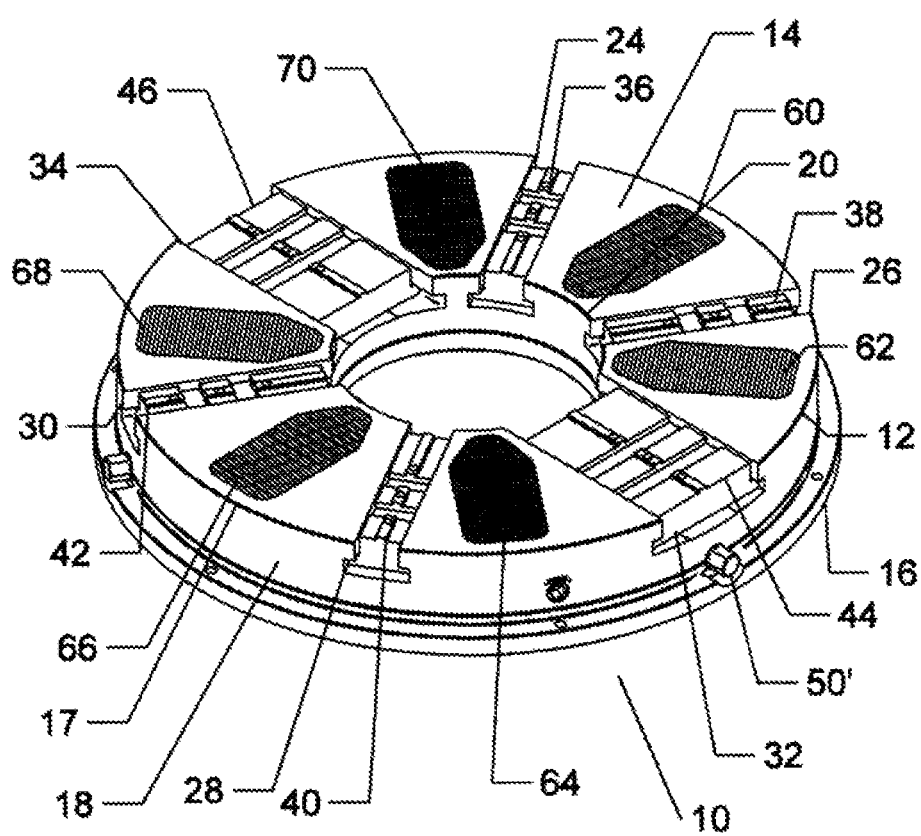
FIG. 1 is a perspective view of the multipurpose chuck without top jaws.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the Figures in general, and specifically FIGS. 1-6, illustrated is the multipurpose chuck 10 formed from a circular body 12 defined by a top plate 14 spaced apart from a back plate 16 with an outer edge 17 forming a continuous outer side wall 18 and an inner edge 20 forming a chamber 22 therebetween; the top plate 14 having four narrow slots 24, 26, 28, 30 and two wider slots 32, 34 extending between the outer edge 16 and the inner edge 20. Each slot is positioned in equal 60 degree radial spacing. The wider slots 32, 34 are positioned 180 degrees apart on the radial spacing.

Figure 2:
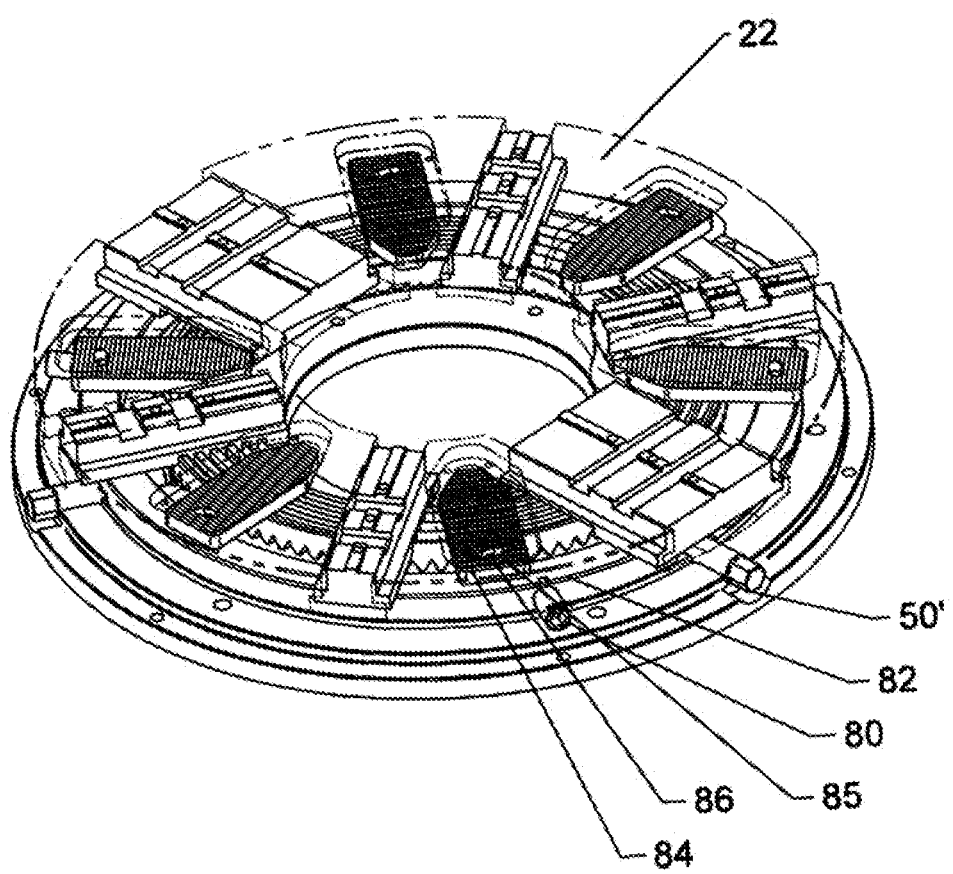
FIG. 2 is a perspective view thereof without top jaws and without a top plate.
Figure 3:
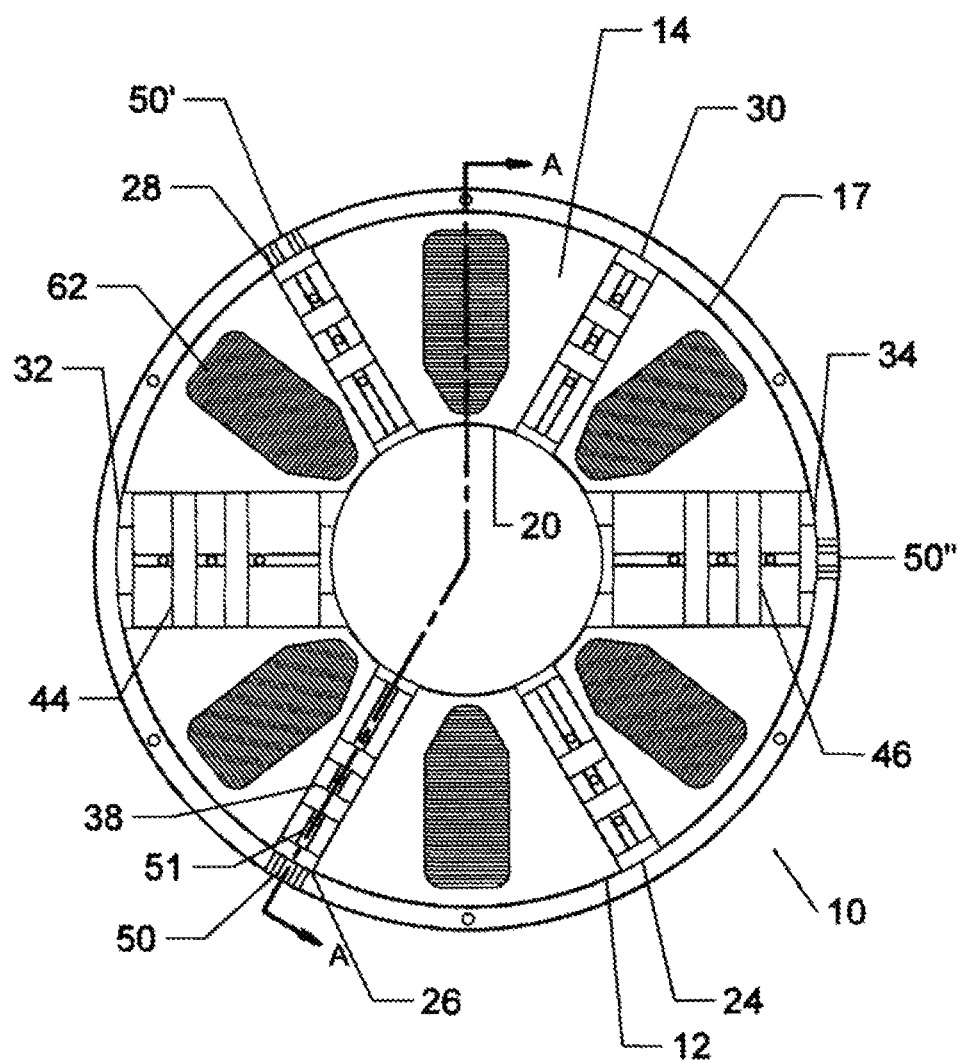
FIG. 3 is a top view thereof.
Figure 4:
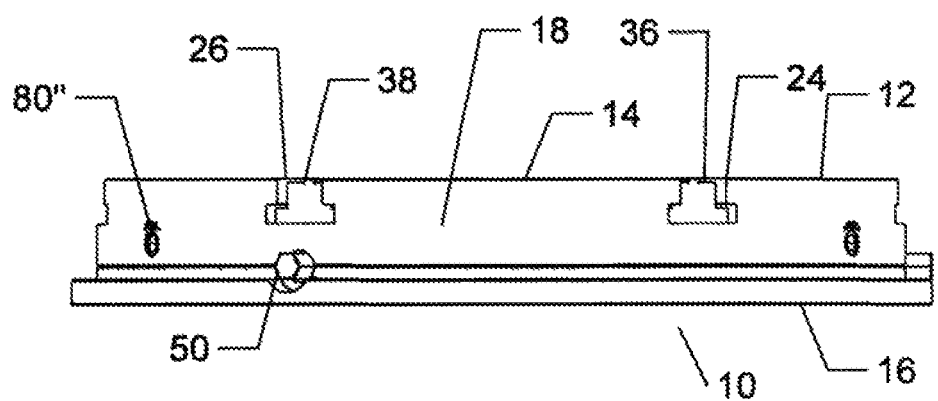
FIG. 4 is a front view thereof.
Figure 5:
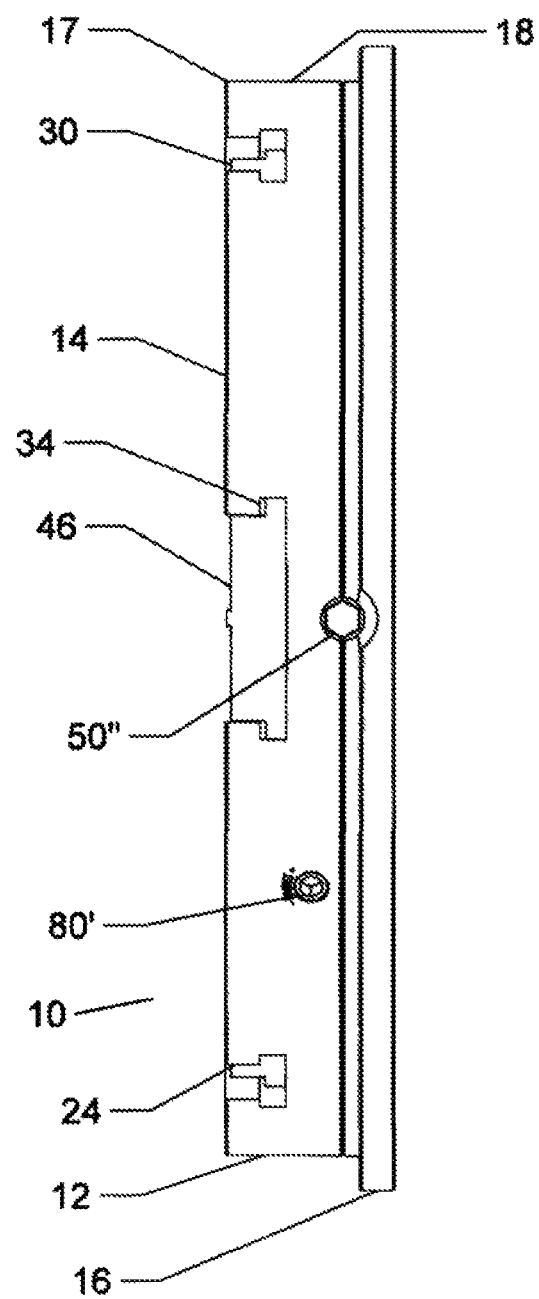
FIG. 5 is a right side view thereof.
Figure 6:
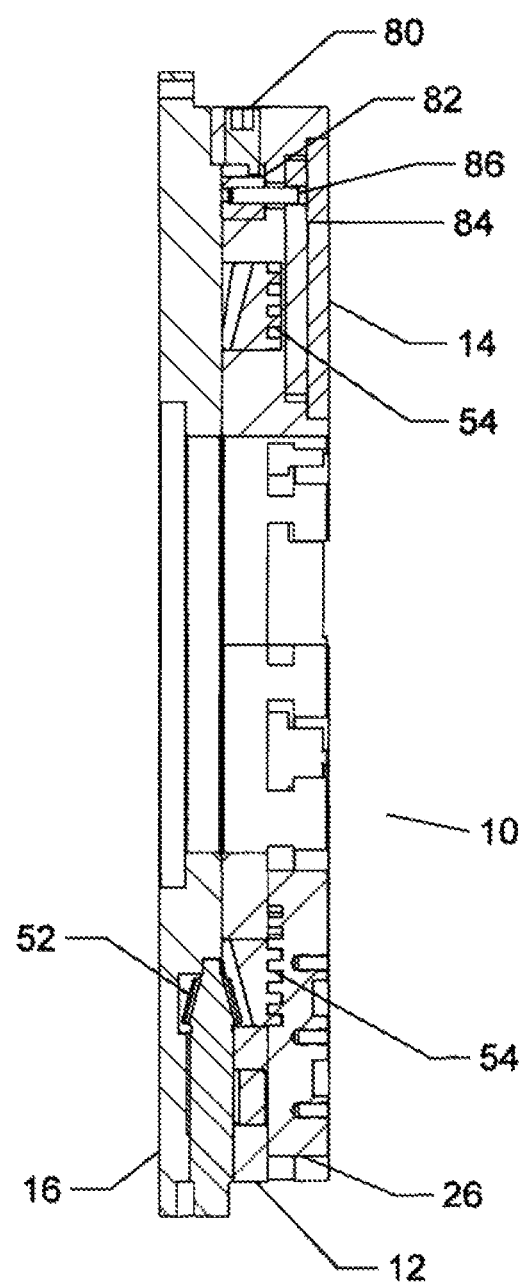
FIG. 6 is a cross-sectional view thereof taken along lines AA of FIG. 3.
Figure 7:
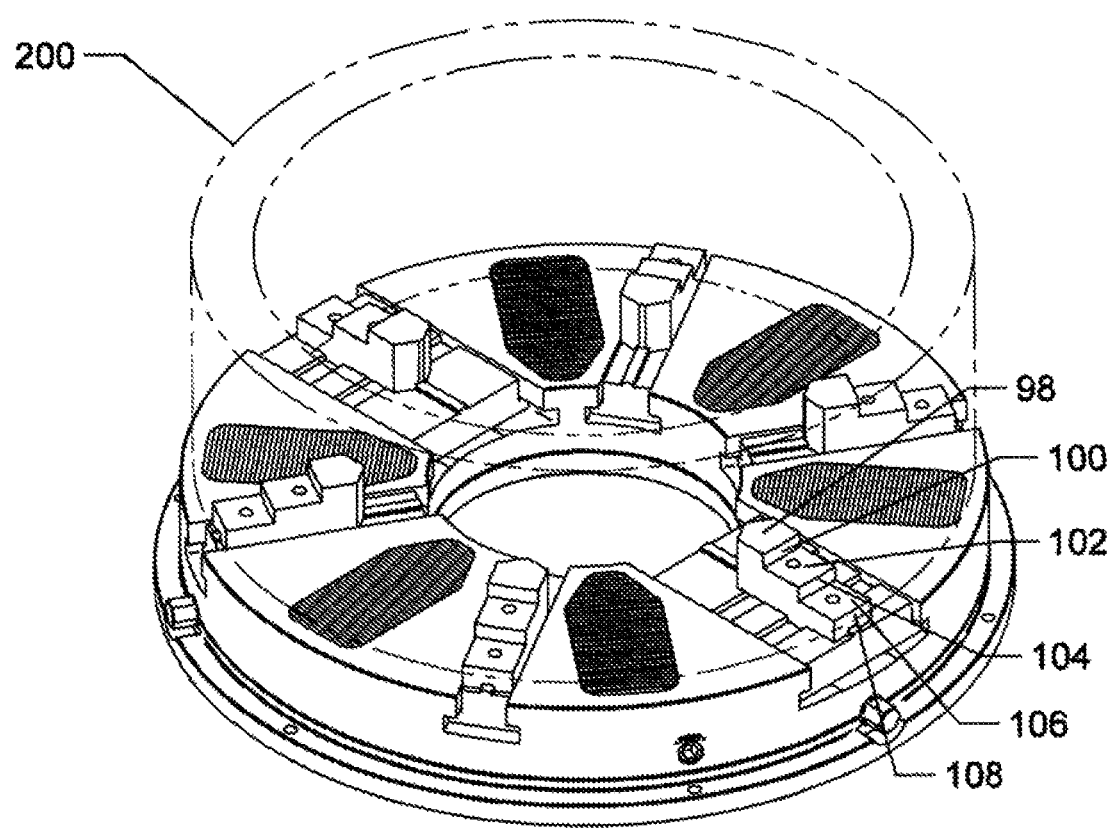
FIG. 7 is a perspective view of the multipurpose chuck illustrating an inner diameter gripping configuration.
Figure 8:
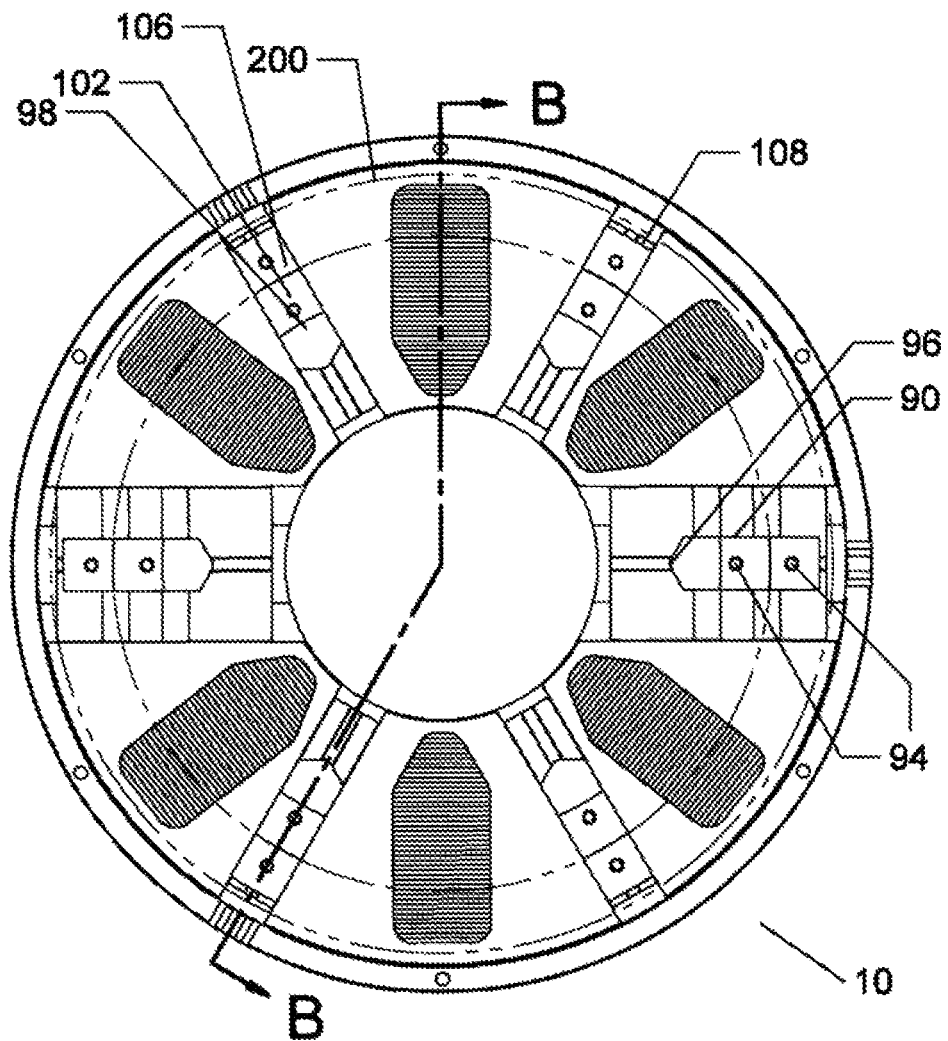
FIG. 8 is a top view thereof.
Figure 9:
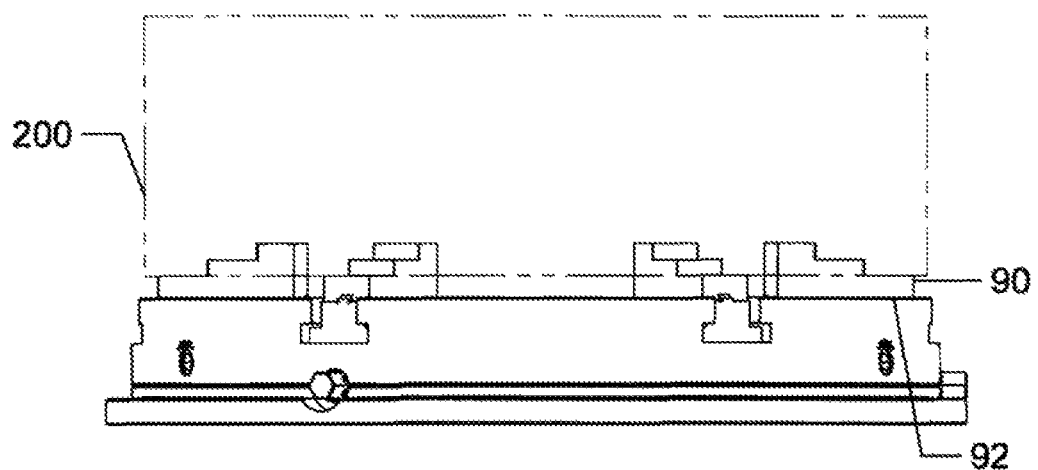
FIG. 9 is a front view thereof.
Figure 10:
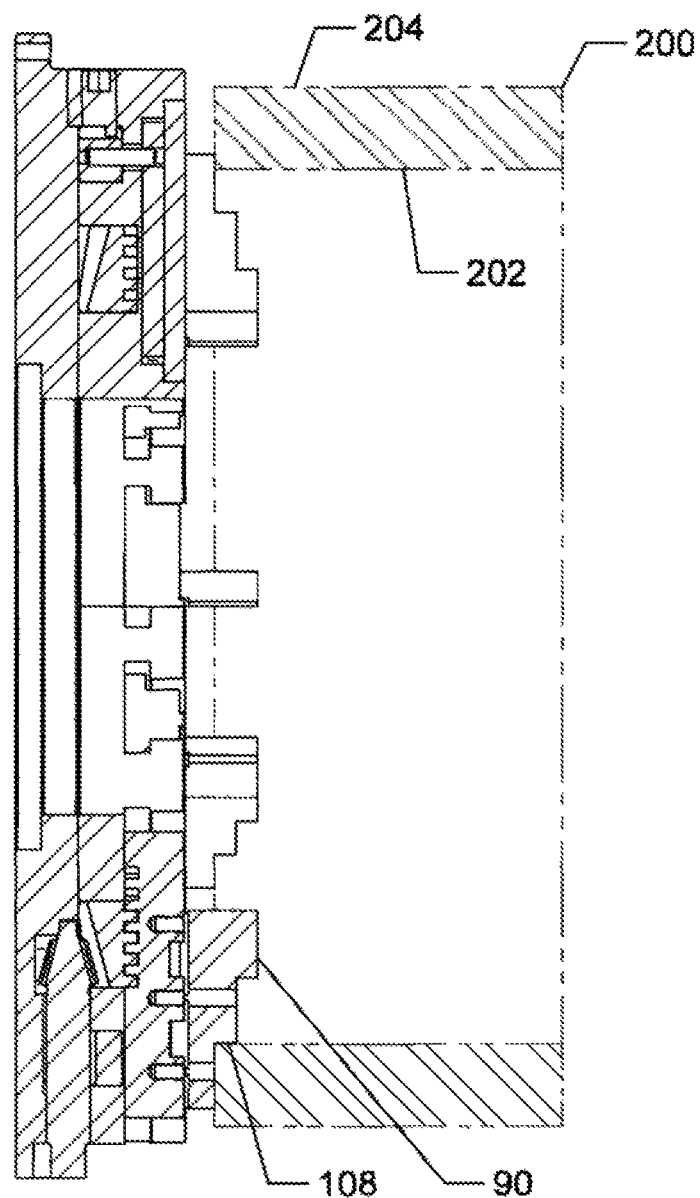
FIG. 10 is a cross-sectional view thereof taken along lines BB of FIG. 7.
Figure 11:
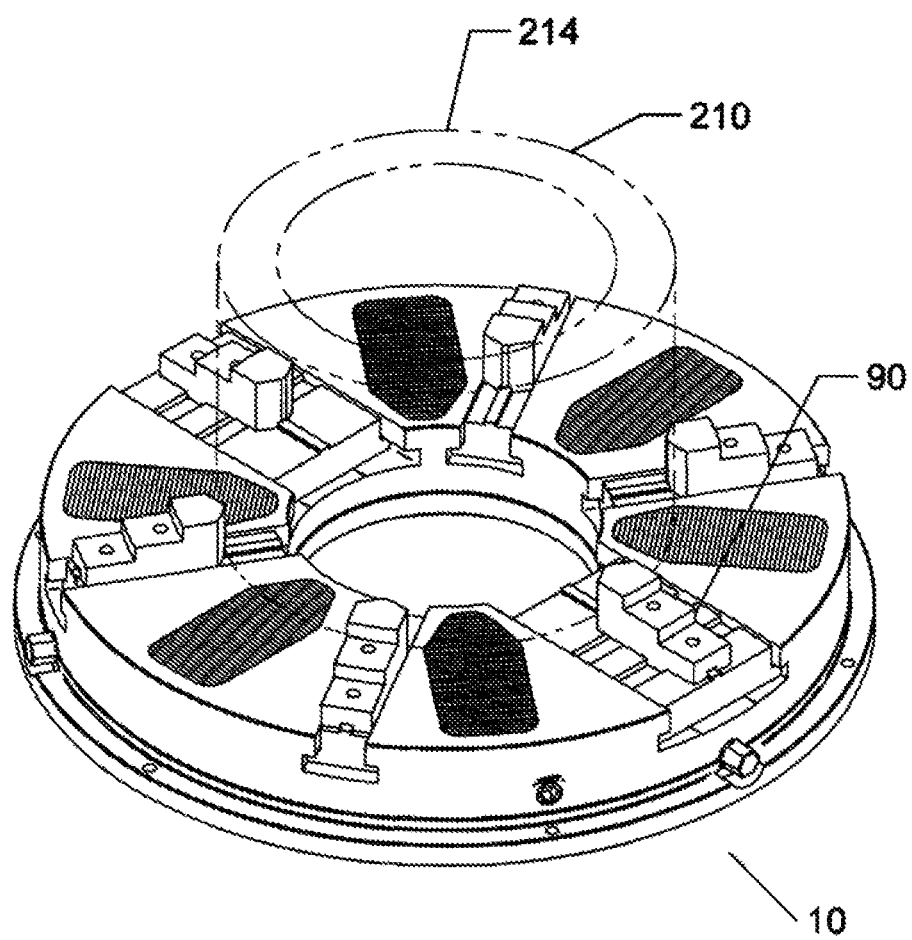
FIG. 11 is a perspective view of the multipurpose chuck illustrating an outer diameter gripping configuration.
Figure 12:
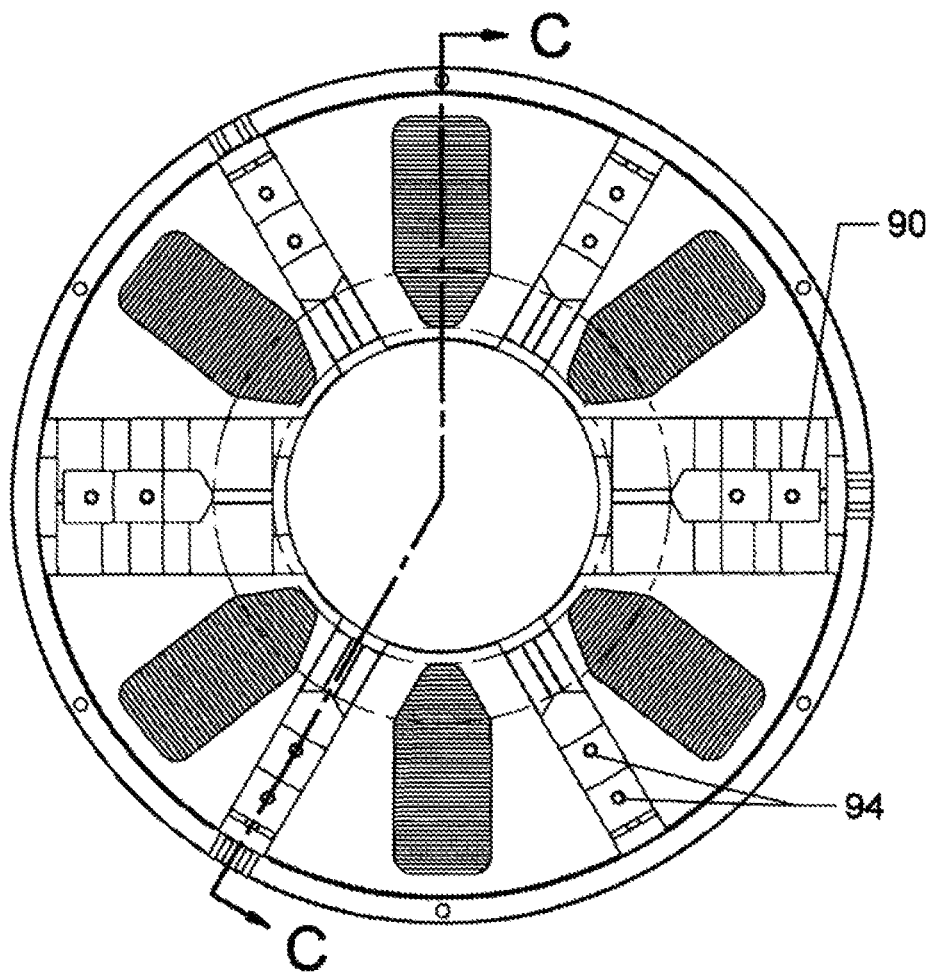
FIG. 12 is a top view thereof.
Figure 13:
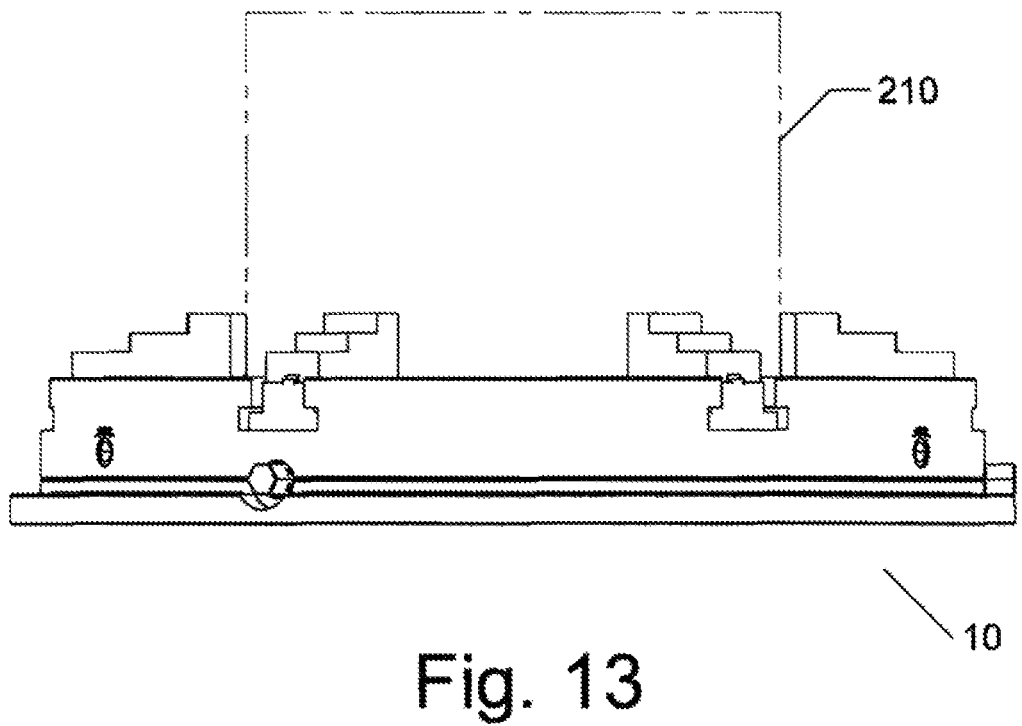
FIG. 13 is a front view thereof.
Figure 14:
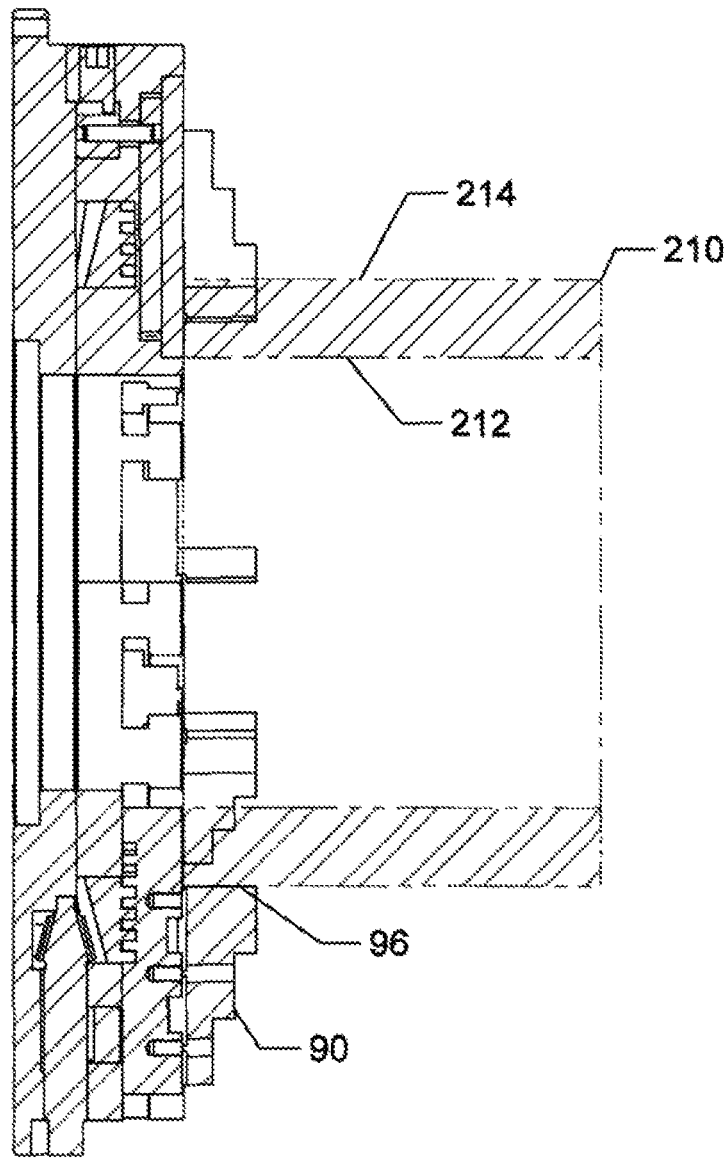
FIG. 14 is a cross-sectional view thereof taken along lines CC of FIG. 11.
Figure 15:
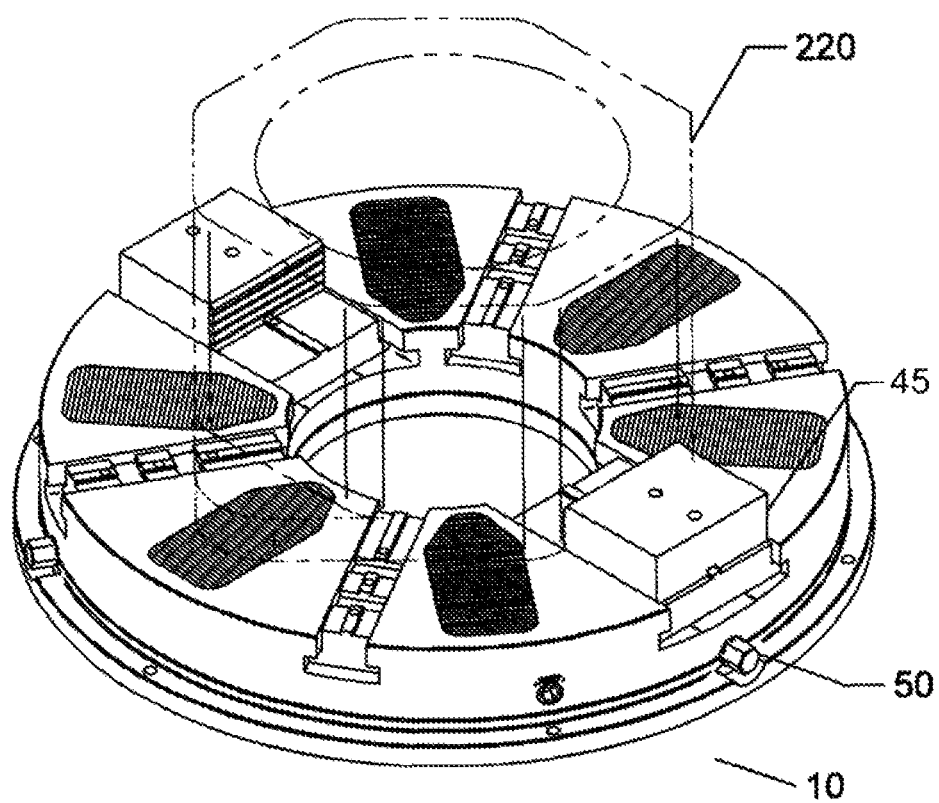
FIG. 15 is a perspective view of the multipurpose chuck illustrating a vice grip configuration.
Figure 16:
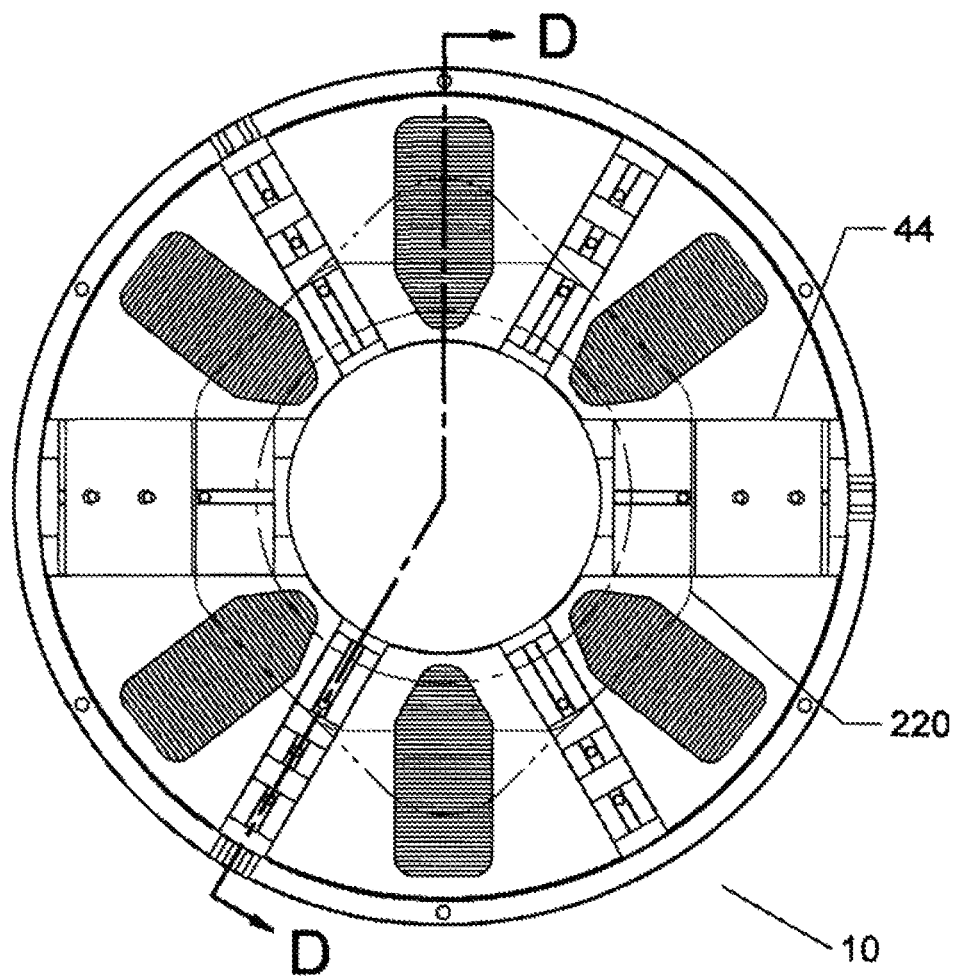
FIG. 16 is a top view thereof.
Figure 17:
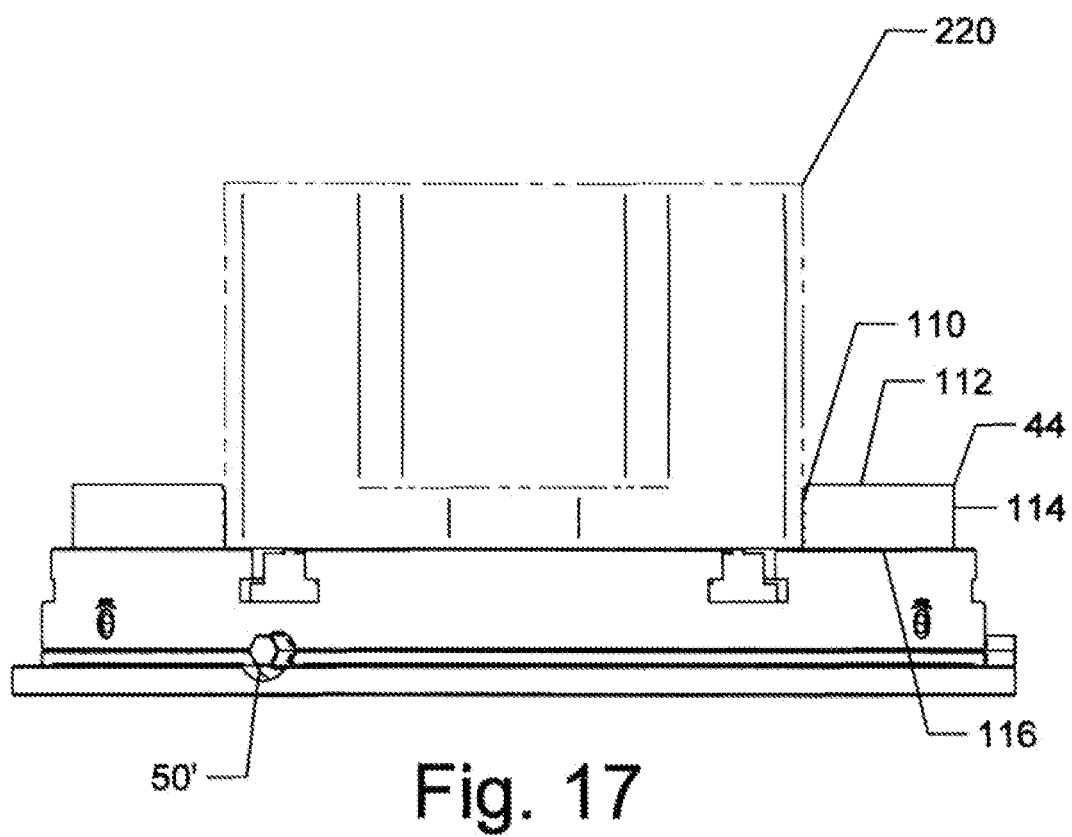
FIG. 17 is a front view thereof.
Figure 18:
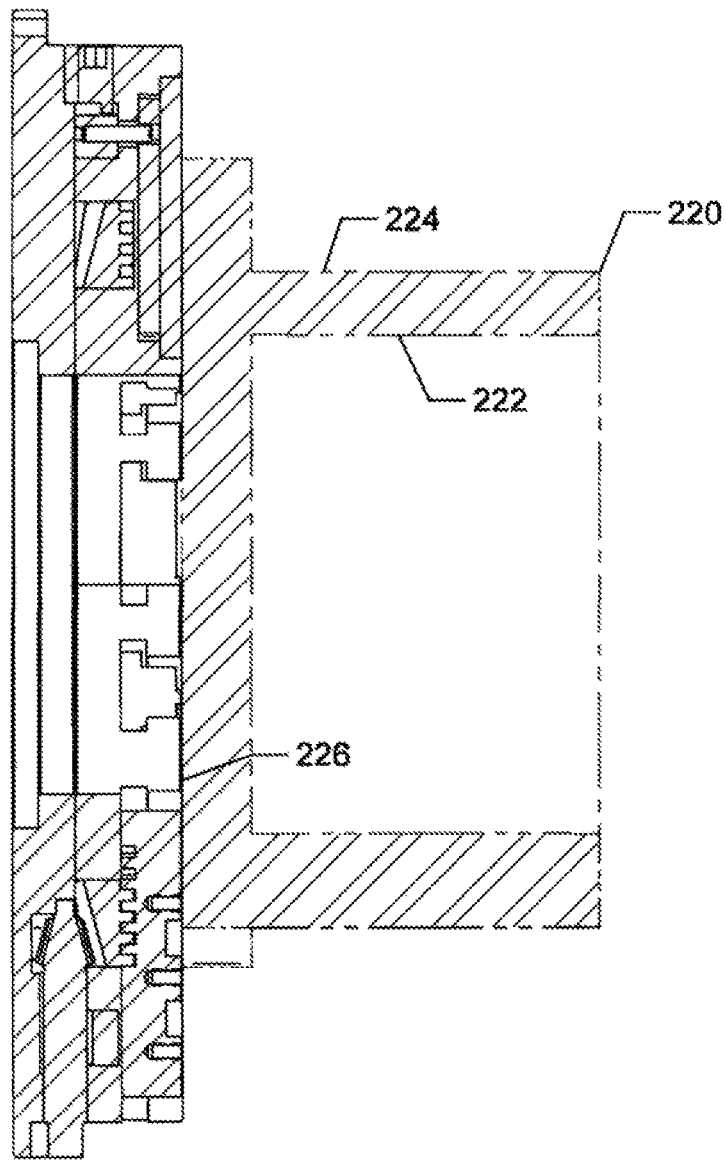
FIG. 18 is a cross-sectional view thereof taken along lines DD of FIG. 15.
Figure 19:
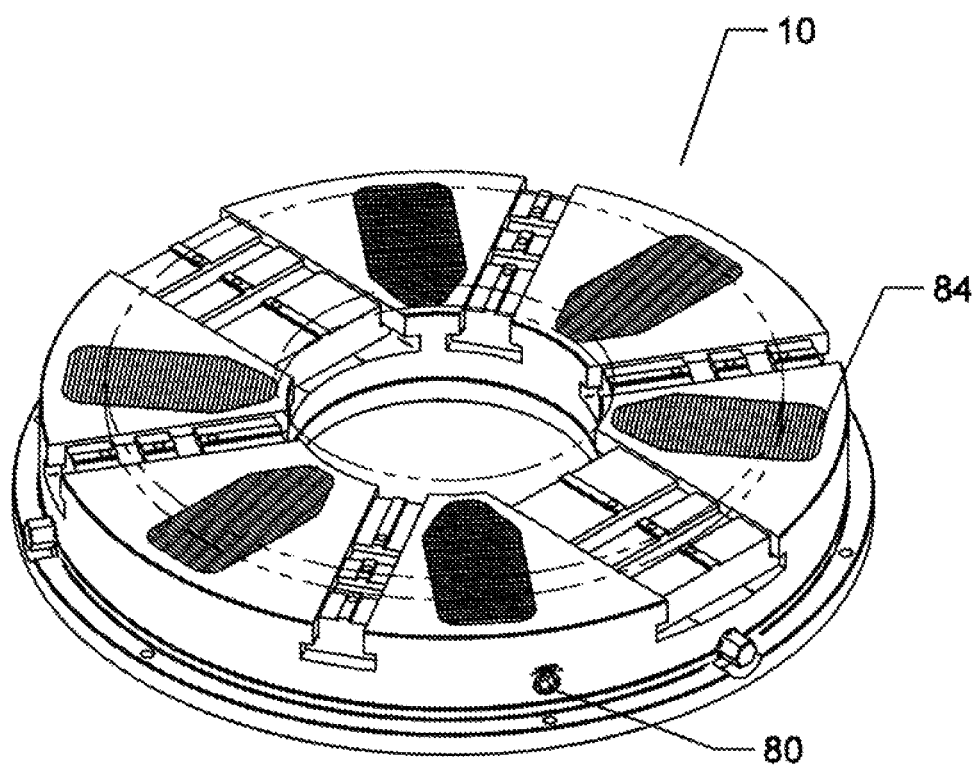
FIG. 19 is a perspective view of the multipurpose chuck illustrating a magnet gripping configuration.
Figure 20:
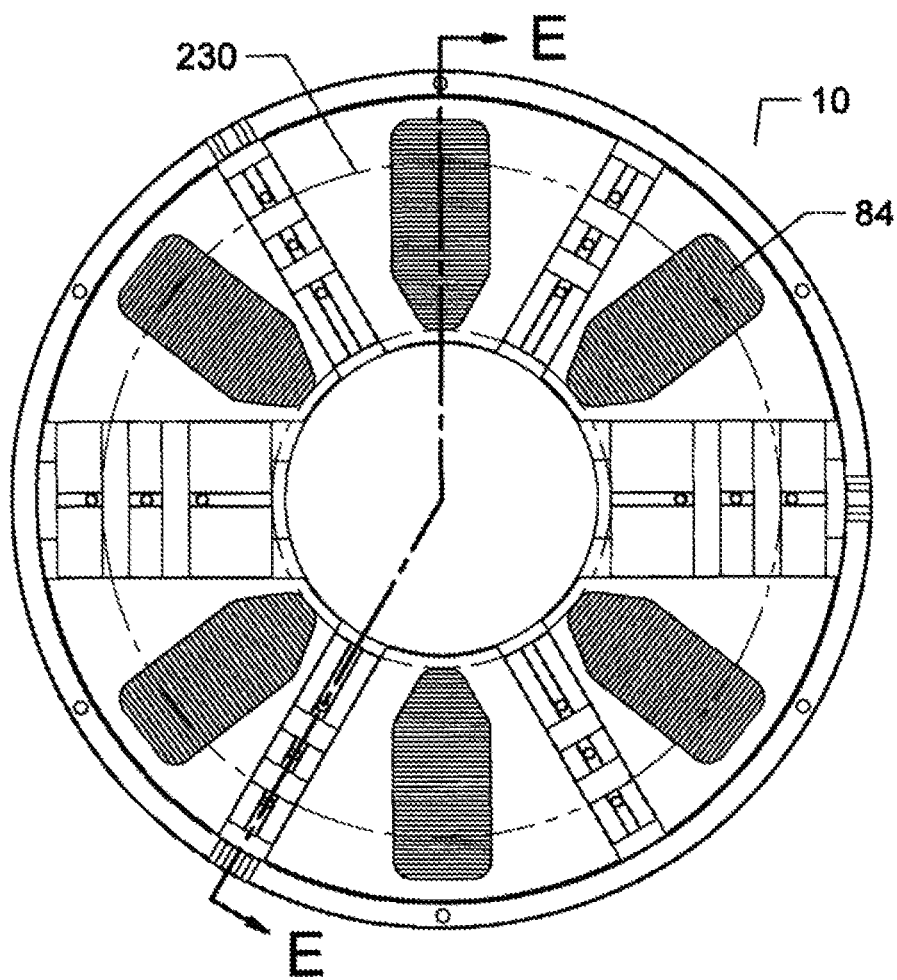
FIG. 20 is a top view thereof.
Figure 21:
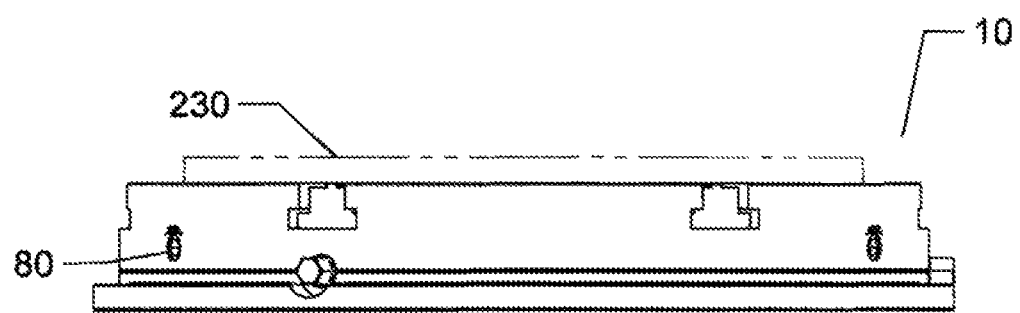
FIG. 21 is a front view thereof.
Figure 22:
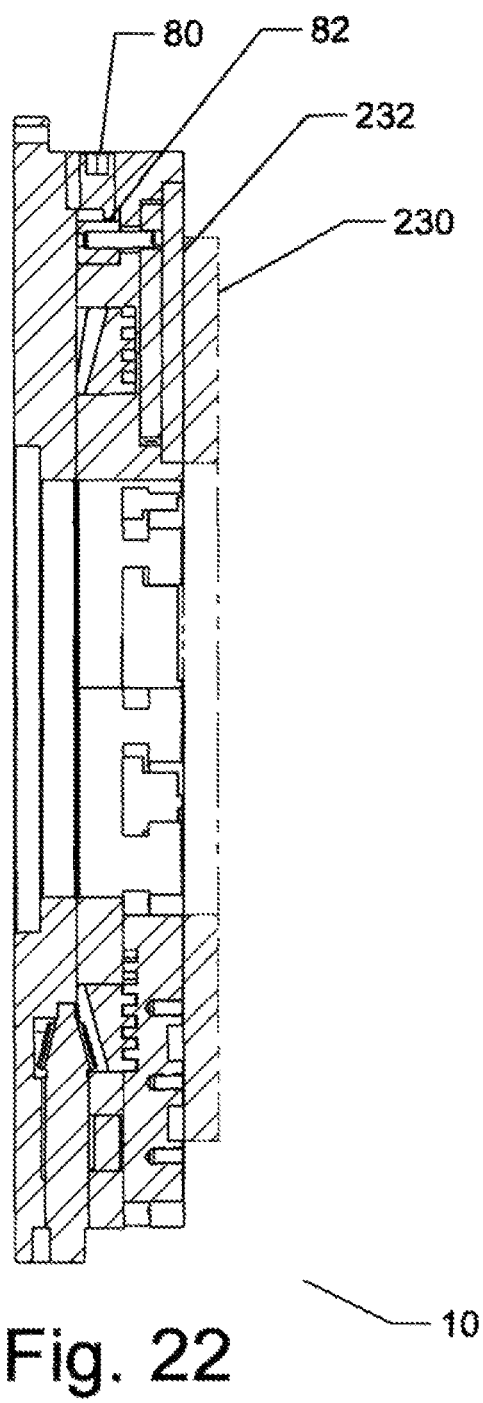
FIG. 22 is a cross-sectional view thereof taken along lines EE of FIG. 19.

A first narrow jaw plate 36 is positioned in the first narrow slot 24, the first narrow slot having an inverted T-shape constructed and arranged to receive the first narrow jaw plate 36 having a reciprocal engaging surface. A second narrow jaw plate 38 is positioned in the second narrow slot 26, the second narrow slot having an inverted T-shape constructed and arranged to receive the second narrow jaw plate 38 having a reciprocal engaging surface. A third narrow jaw plate 40 is positioned in the first narrow slot 28, the first narrow slot having an inverted T-shape constructed and arranged to receive the third narrow jaw plate 40 having a reciprocal engaging surface. A fourth narrow jaw plate 42 is positioned in the fourth narrow slot 30, the first narrow slot having an inverted T-shape constructed and arranged to receive the fourth narrow jaw plate 42 having a reciprocal engaging surface. The narrow jaw plates 36, 38, 40, 42 are interchangeable and slidable within their respective slot 24, 26, 28, 30. The jaw plates are constructed and arranged in the equal 60 degree radial spacing to allow equal gripping with three or six top jaw members that can be attached to the jaw plates, as shown in FIG. 2, and will be further described. A first wide jaw plate 44 is slidably secured in the first wider slot 32. A second wide jaw plate 46 is slidably secured in the second wider slot 34.

Operation of the jaw plates and any jaw member attached thereto is by rotation of a pinion 50 having a first end 51 extending through the outer edge side wall 18 and inner edge 20 including a bevel gear 52 for engaging a scroll wheel 54; the scroll wheel 54 having a spiral set of teeth constructed and arranged to engage corresponding scroll teeth formed in each said jaw plate for moving each said jaw plate in a linear motion between the inner edge 20 and said outer edge 16, For drawing simplification, multiple pinions, 50, 50' and 50", are positioned around the perimeter for control of the jaw plates for various positions.

A laminated permanent magnetic plate is positioned between each said slot. A first magnet 60 is positioned between slots 24 and 26; a second magnet 62 is positioned between slots 26 and 32; a third magnet 64 is positioned between slots 32 and 28; a fourth magnet 66 is positioned between slots 28 and 30; a fifth magnet 68 is positioned between slots 30 and 34; and a sixth magnet 70 is positioned between slots 34 and 24. The switchable magnets consist of a static top plate made of a laminated material and a movable magnet plate positioned beneath made of a laminated magnet material. As these magnets are moved from one position to the other, the magnetic field is increased or decreased. A magnet cam 80 protrudes out of the chuck outer edge 16; the cam is attached to a magnet wheel 82 driving a laminated magnet plate 84 by use of a wheel post 86. The magnet cam 80 is available for moving the magnet plate 84 between a storage position and an engagement position.

Magnet actuation is by rotation of the magnet cam 80, which protrudes out of the chuck outer wall 18, and is rotated via the user rotating the magnet wheel 82. The magnet wheel 82 has posts 86 at each magnet location which protrude into a cam slot 85 in the magnet plates 84. As the magnet wheel 82 and post 86 rotate, the interaction with the cams 80 slides the magnet plates into one position or the other.

Referring to FIGS. 7-10, illustrated is the multipurpose chuck 10 with an inner diameter gripping configuration. For illustration purposes, workpiece 200 is attached to the chuck 10, the workpiece 200 having an inner sidewall 202 and an outer sidewall 204. For ease of explanation, each of the narrow jaw members are identical, having stepped surfaces. Jaw member 90 is defined by a flat bottom 92 securable to a jaw plate by fasteners 94; the jaw member 90 having an inner edge 96 with a top surface 98, and a first step wall 100 leading to a middle surface 102. A second step wall 104 leads to lower surface 106 leading to a third step wall 108 forming an outer edge. The position of the jaw member is directed by one of the pinions 50. The jaw members can be secured to three or more jaw plates for securing a workpiece having a uniform circular shape. The jaw members can be secured to three or more jaw plates for securing a workpiece having a uniform inner diameter.

Referring to FIGS. 11-14, illustrated is the multipurpose chuck 10 with an outer diameter gripping configuration. In this illustration, workpiece 210, having an inner surface 212 and an outer surface 214, is held by jaw member 90; only one jaw member is described for ease of drawing description. In this configuration, the outer diameter 214 is held in position by the inner edge 96 of the jaw member 90, and the position of the jaw member is directed by one of the pinions 50. The jaw members 90 can be secured to three or more jaw plates for securing a workpiece having a uniform outer diameter.

Referring to FIGS. 15-18, illustrated is the multipurpose chuck 10 in a vice gripping configuration. In this illustration, workpiece 220 has an inner surface 222, an outer surface 224, and a bottom surface 226. The workpiece 220 is captured by wide jaw member 45 defined by an inner edge 110, top surface 112, outer edge 114 and bottom surface 116. The position of the jaw member is directed by one of the pinions 50. The jaw members can be secured to two opposing jaw plates for securing a workpiece having non-uniform outer diameter.

Referring to FIGS. 19-22, illustrated is the multipurpose chuck 10 in a magnet gripping configuration. In this illustration, workpiece 230, having a lower surface 232, is secured to the top plate 14 of the chuck by actuation of the permanent magnet plate 84. For drawing simplicity, one magnet plate 84 includes element numbering. Magnet actuation is by rotation of the magnet cam 80 which is rotated via the user to rotate the magnet wheel 82. The magnet wheel 82 has posts at each magnet plate location, wherein interaction with the cams 80 slides the magnet plates into one position or the other. The magnet plate 84 can be activated by moving the permanent magnet by rotation of said magnet actuation cam 80. Pinions and magnet cams are both situated at three places, 120 degrees apart for easier access by the user.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternatives are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A multipurpose chuck comprising:
    a circular body defined by a top plate spaced apart from back plate with an outer edge forming a continuous outer side wall and an inner edge forming a chamber therebetween,
    said top plate of said body having four narrow slots and two wider slots extending between said outer edge to said inner edge, each said slot positioned in equal 60 degree radial spacing, said wider slots positioned 180 degrees apart on the radial spacing;
    a narrow jaw plate slidably secured in each said narrow slot, said narrow jaw plate constructed and arranged to receive a jaw member releaseably securable thereto;
    a wide jaw plate slidably secured in each said wider slot, said wide jaw plate constructed and arranged to receive a jaw member releaseably securable thereto;
    a pinion having a first end extending through said outer edge and a second end including a bevel gear, said bevel gear engaging a mating bevel gear on a scroll wheel, said scroll wheel having spiral set of teeth constructed and arranged corresponding scroll teeth formed in each of said jaw plate for moving each said jaw plate in a linear motion between said inner edge and said outer edge;
    a laminated permanent magnet plate positioned between each said slot;
    a magnet actuation cam having a first end extending through said outer edge and a second end engaging a magnet wheel attached to each said magnet plate by a wheel post, said magnet cam available for moving a permanent magnet between a storage position and an engagement position;
    wherein a narrow jaw member can be secured to at least three said jaw plates for securing a workpiece having a uniform circular shape;
    wherein a narrow or wide jaw member can be secured to said wide jaw plates for use in vise gripping a workpiece having a non-uniform circular shape;
    wherein said magnet plate can be activated by moving of the permanent magnet by rotation of said magnet actuation cam.

2. The multipurpose chuck according to claim 1 wherein each said jaw member includes an inner edge, an outer edge, and step surfaces therebetween, said jaw member secured to a Jaw plate with fasteners.

3. The multipurpose chuck according to claim 2 wherein each said jaw plate is arranged in equal 60 degree radial spacing to allow gripping of circular workpieces with three or more members.

4. The multipurpose chuck according to claim 1 wherein two of said jaw plates are opposing each other for use in a vise configuration.

5. The multipurpose chuck according to claim 1 wherein said magnet plates are switchable and mounted flush to the top plate.

6. The multipurpose chuck according to claim 1 wherein said magnet plates are static and constructed of a laminated magnet material.

7. The multipurpose chuck according to claim 1 wherein said magnet wheel has posts at each magnet location which protrude into a cam slot in said magnet plates, wherein, as the magnet wheel and post rotate, the interaction with the cams reposition the magnet plates.

8. The multipurpose chuck according to claim 1 wherein said pinion for operating said jaw plates is situated at three places 120 degrees apart.

9. The multipurpose chuck according to claim 1 wherein said magnet cam for operating said magnet plates is situated at three places 120 degrees apart.

* * * * *